UNITED STATES PATENT OFFICE.

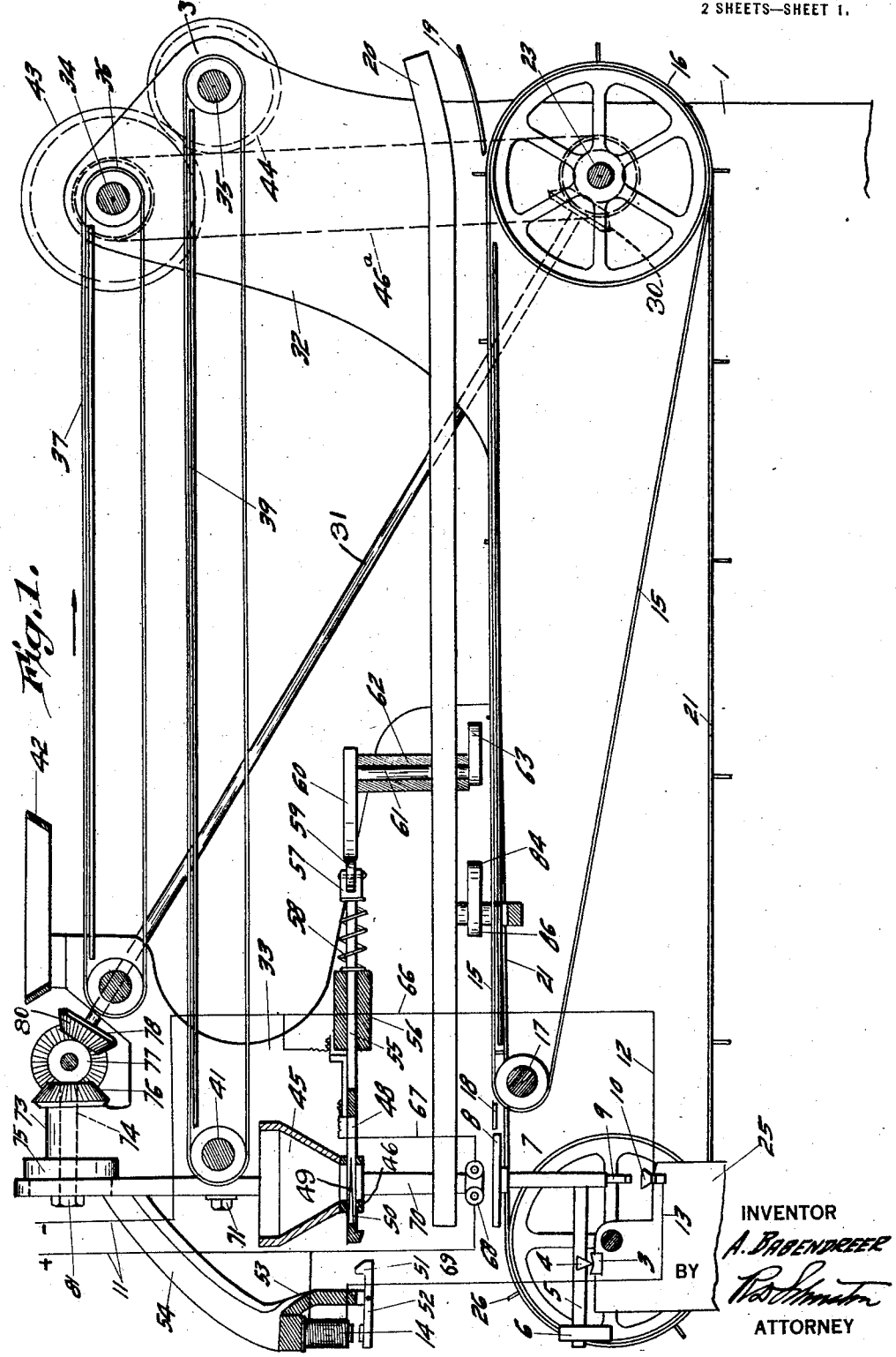

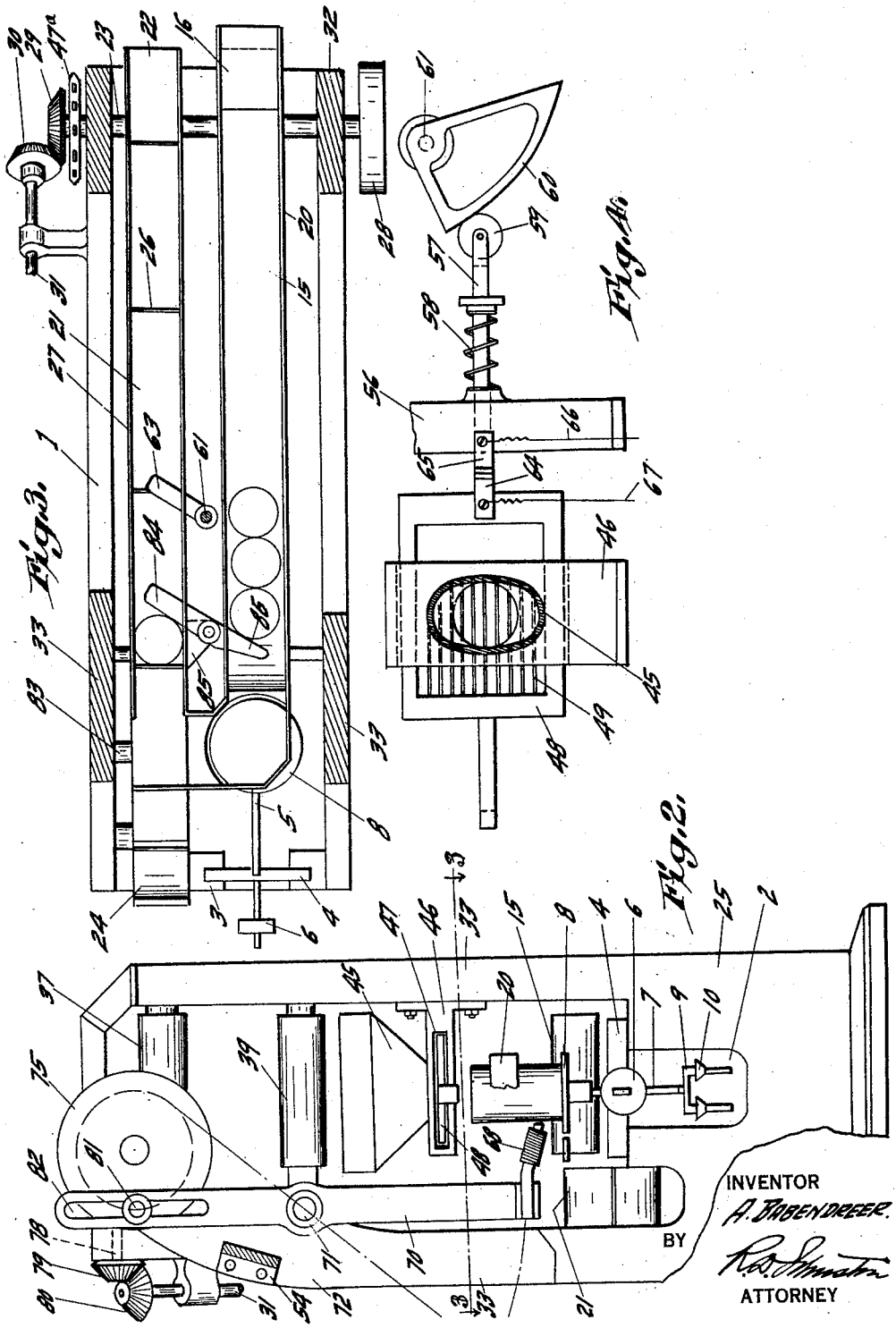

ALBERT BABENDREER, OF BILOXI, MISSISSIPPI.

CAN-FILLING APPARATUS.

1,420,401.   Specification of Letters Patent.   Patented June 20, 1922.

Application filed October 13, 1919. Serial No. 330,422.

*To all whom it may concern:*

Be it known that I, ALBERT BABENDREER, a citizen of the United States of America, residing at Biloxi, in the county of Harrison and State of Mississippi, have invented certain new and useful Improvements in Can-Filling Apparatus, of which the following is a specification.

My invention relates to an automatic machine for filling cans with shrimp and like articles.

My invention contemplates the provision of a novel feed means for the shrimp adapted to collect them from a hopper and drop them individually through a feed hopper into the can to be filled. The object of so controlling the feed is that the automatic scale controlled gate for interrupting the feed can work more accurately and efficiently and with less injury to the shrimp.

A further object is to provide a novel type of feed gate which is preferably spring operated and controlled by a magnetically operated latch that responds to the movement of a scale platform under a fully loaded can.

A further object is to provide a novel means for transferring the loaded cans from the scale to a conveyor, such transfer means involving an oscillating magnet which is energized directly or indirectly responsive to the scale movement under a fully loaded can.

A further object is to provide a novel arrangement of conveying belts for the empty and loaded cans, the empty can conveyor being smooth and the loaded can conveyor having bars or fingers which will positively move the loaded cans so that each will function as the actuating means to shift a stop, which restrains the movement of the empty cans resting on the smooth belt, and allow one to move forward onto the scale platform.

A further object is to utilize the loaded cans to reset the feed gate and to de-energize the transfer magnet.

My invention comprises the novel details of construction and arrangements of parts which in their preferred embodiment only are illustrated in the accompanying drawings which form a part of this specification and in which:

Figure 1 presents my machine in vertical sectional elevation with the cans omitted, the scale being in raised position and the feed gate in closed position.

Figure 2 is a front end view.

Figure 3 is a horizontal sectional view taken on the line of 3—3 of Figure 2.

Figure 4 is an enlarged detailed plan view of the gate mechanism.

Similar reference numerals refer to similar parts throughout the drawings.

In the preferred embodiment of my invention 1 represents a bed frame having its front end cut away at 2 and provided on each side with knife edge bearings 3 for the knife edge 4 that supports a scale beam 5 which is provided at its outer end with an adjustable scale weight 6 and at its inner end with a standard 7. This standard on its upper end is provided with a scale platform 8 and at its lower end carries a double circuit closing switch 9 adapted to coact with the switch terminals 10 to close a branch circuit leading from the power circuit 11 over wires 12 and 13, which latter includes a magnet 14. The scale platform 8 stands normally level with the top flight of the empty can conveyor 15 which as seen in Fig. 3 is a plain belt driven by a large pulley 16 at one end and passing over a small pulley 17 at the end adjacent to the scale platform. A bridge plate 18 closes the space between the conveyor 15 and the scale platform 8 and this conveyor is driven to the left Fig. 1 and has a smooth upper surface onto which the empty cans are fed down an incline 19. A guard plate 20 extends along each side of this conveyor 15 the outside plate extending beyond and turning at right angles to the rear across the scale platform and a loaded can conveyor 21 which is disposed with its top flight at a lower level than that of conveyor 15 and is driven in a reverse direction thereto by pulley 22 on the power shaft 23, the conveyor at its other end passing about an idler pulley 24 journalled in the end wall 25 of the bed frame. This conveyor is provided at intervals with cross bars 26 or the like and has on each side guard plates 27. The rear guard plate 27 being interrupted so as to leave an opening between its left hand end and the rear end of the front guard plate 20 for the insertion of the stop block 83 for the loaded cans. The power shaft 23 which drives the pulleys 16 and 22 is itself driven by pulley 28 at one end and at the other end drives a bevelled gear 30 which drives an upwardly inclined shaft 31 for the purposes later described.

The superstructure of the bed frame comprises vertical front and rear brackets 32 and 33 at both ends of the frame and in the brackets 32 I journal shafts 34 and 35, the former supporting a pulley 36 for the top shrimp feed belt 37 and the lower a similar pulley 38 for the reversely driven lower shrimp belt 39, the other brackets 33 supporting idler pulleys 40 and 41 for the belts 37 and 39 respectively. The lower belt is extended beyond the upper belt at both ends and the upper belt passes through a feed hopper 42 into which shrimp and like articles are charged and from which they are conveyed to the right by the slowly moving belt 37. The belts 34 and 35 are driven at different speeds the lower belt traveling sufficiently faster than the upper belt to separate or thin out the shrimp so that they will fall one at a time into the feed hopper 45 over the scale platform 8.

The shaft 34 is driven by sprocket chain 46ª leading from the sprocket wheel 47ª on the main shaft 43 to a corresponding sprocket wheel on shaft 34.

The hopper 45 is supported by a cross bar 46 carried on front brackets 33 which bar has an elongated horizontal slot 47 through which a rectangular gate frame slides. This frame, which is shown more fully in detail in Fig. 4, has mounted in its front cross member a series of pins 49 disposed in close association with their pointed ends free so that they form a gate sufficiently wide to shut off the discharge of shrimp from the hopper 45, a shrimp caught by the needles being pierced thereby instead of macerated or injured. Such shrimp is held impaled on the pins until the gate is retracted to open it, when the hopper wall will strip the shrimp from the pins and drop it into the next can. This not only avoids injuring a shrimp but it insures more accurate measurement since no part of a shrimp will fall into a can after it has received enough shrimp to overbalance the scale. At is front end the frame 48 is provided with a latch arm 50 having a down turned hook adapted to engage and interlock with a detent 51 on a pivoted latch 52. This latch is pivoted to an arm 53 on a bracket 54 which supports the magnet 14 and the front end of the latch is disposed under the magnet and is adapted to be attracted thereby to disengage the detent 51 from the latch arm 50. The rear end of the gate frame 48 is provided with a center bearing rod 55 which reciprocates horizontally in a bearing in a cross bracket 56 between the brackets 33. A yoke head 57 is mounted on the rear end of rod 55 and a coil spring 58 works between the bracket 56 and the yoke head 57, tending to shift the gate to position to stop the feed for the hopper 45.

A roller 59 is journalled on a vertical axis in the yoke 57 and is disposed to be engaged by a horizontally swinging cam 60, mounted on a cam shaft 61, which turns in a vertical bearing in a bracket 62 and has attached to its lower end a trip arm 63 disposed in the path of the loaded cans on the conveyor 21. The rear end wall of the gate frame 48 carries a contact 64 adapted to engage a contact 65 on the bracket 56 and close a circuit from wire 66 through wire 67 to a pair of magnets 68 and thence back by wire 69 to the main circuit. These magnets are mounted on the bottom of an oscillating arm 70 which is pivoted near its center on an axis 71 on an overhanging extension 72 of the rear bracket 33. This extension is disposed crosswise of the machine and provided at its upper overhung end with a bearing 73 for a shaft 74 having on one over hung end a disc 75 and on the other end a bevel gear 76 meshing a bevel gear 77 on a shaft 78 driven by bevel gear 80 on upper end of the shaft 31 which turns in bearings on the bracket 33. The disc carries a crank pin 81 having a reduced portion which works freely in an elongated slot 82 in the upper end of the oscillating arm 70. As a result of this arrangement the constant rotation of disc 75 vibrates the arm 70 and swings the magnet 68 back and forth through a path of travel which at its forward end brings the magnets practically into contact with the can being filled on the scale and which in its rear end passes beyond the belt 21 and above a stop 83 which will arrest and disengage the filled can from the magnets and leave the can free to travel with the loaded belt 21, on which it will be resting at the time it is released by the magnets.

As a can travels with this belt 21 it first strikes a trip arm 84 normally held in the position shown by spring 85 and having a forward end 86 projecting over the empty can belt 18 and forming a stop to hold the empty cans thereon back from movement therewith. As the stop is tripped by a loaded can its stop arm moves to permit one empty can to proceed forward with belt 15 and then resumes position to stop the succeeding empty cans until it is again tripped by the next loaded can. As the loaded cans proceed past trip arm 84 they next trip the arm 63 with the result that the cam 60 is moved to shift the gate to the left against the action of its spring 58 breaking the contacts 64 and 65, moving the gate pins 49 clear of the hopper opening and causing the latch arm 50 to again engage the latch 52 and be held thereby until the magnet 14 is energized by the depression of the scale by the next loaded can.

In operation, assuming the feed gate 49 to be latched in open position and all belts running with a can to be filled resting on the scale platform 8 and the magnets 68 and 14 de-energized, the shrimp fall in succession through the hopper into the can until it is fully loaded, whereupon the scale platform drops closing the circuit to energize magnet 14, whereupon the gate is unlatched and by spring 58 jerked to closed position thereby interrupting the feed shrimp and at the same time closing the circuit to energize magnets 68 which on their next forward vibration will take hold of the loaded can and draw it rearwardly until it is arrested by stop 83 and released from the magnets whereupon it starts traveling to the right on belt 21. The projections on this belt 21 will force the loaded can first positively to operate the trip arm 84 so as to release an empty can and next to trip arm 63 so as to open the gate for the renewed feed of shrimp and at the same time to deenergize vibrating magnets 68 which thus work idle until the can is fully loaded whereupon the scale drops, the magnets 14 and 68 are again energized and the operation is repeated.

My invention may be widely varied in its detailed construction without departing from the novel principles of its construction.

I claim:

1. In a can filling apparatus, a feed hopper, a scale below the hopper, a gate for interrupting the feed from said hopper, and electro-magnetic means responsive to the closing of the gate and adapted to transfer a loaded can from the scale.

2. In a can filling apparatus, a feed hopper, a scale below the hopper, a gate for interrupting the feed from said hopper, electro-magnetic means controlled by the closing of the gate and adapted to transfer a loaded can from the scale, and electro-magnetic means responsive to the scale movement under a loaded can for controlling the closing the said gate.

3. In a can filling apparatus, scale platform, a feed chute having a feed gate above the scale platform, a reciprocating can transferring magnet, means to reciprocate said magnet, and means responsive to closing the said feed gate to energize said magnet.

4. In a can filling apparatus scale platform, a feed chute having a feed gate above the scale platform, a reciprocating can transferring magnet, means to reciprocate said magnet, and means responsive to closing the said feed gate to energize said magnet, a conveyor to receive the transferred loaded cans, and means responsive to movement of each loaded can to reopen the feed gate and de-energize the transfer magnet.

5. In a can filling apparatus, a scale, an oscillating arm, means to oscillate said arm, a magnet on said arm which approaches the can being filled with each oscillation, and means responsive to the descent of the scale to temporarily energize said magnet, as and for the purposes described.

6. In a can filling apparatus, a scale, means to feed material into a can on the scale, a smooth conveying belt for the empty cans, a conveyor belt with projections for the loaded cans, stop means to hold back the empty cans on the smooth belt, means actuated by a loaded can moving on the loaded can conveyor to trip said stop and permit an empty can to be fed forward onto the scale, and means to transfer the loaded cans from the scale onto the loaded can conveyor.

7. In a can filling apparatus, a scale, a feed chute above the scale, a smooth conveying belt for empty cans leading to the scale, a ribbed conveying belt for loaded cans leading from the scale, a trip arm disposed in the paths of the cans moving on both conveyors and which operate by each passing loaded can to release an empty can to be fed onto the scale.

8. In a can filling apparatus, a scale, a feed chute having a gate above the scale, spring means tending to close the gate, a magnetically controlled latch to hold the gate open, a conveyor for loaded cans, an oscillating transfer magnet for shifting cans from the scale onto said conveyor, means to oscillate said magnet, an electric circuit closed by the descending scale and adapted to energize said magnetic means to release the gate latch, an electric circuit including the transfer magnet, and means to close said latter circuit responsive to the closing movement of said gate.

9. In a can filling apparatus, a scale, a feed gate above the scale, spring means tending to close the gate, a scale controlled latch means to hold the gate open, and means operable by a loaded can to open and relatch the gate, substantially as described.

10. In a can filling apparatus, a scale, a ribbed conveyor for loaded cans, an automatic transfer means to shift the loaded cans from the scale onto said conveyor, a scale controlled means for automatically closing the gate, and means actuated by a loaded can on the said conveyor to reopen the gate.

11. In a can filling apparatus, a scale, a ribbed conveyor for loaded cans, an automatic transfer means to shift the loaded cans from the scale onto said conveyor, a scale controlled means for automatically closing the gate, and means actuated by a loaded can on the said conveyor to reopen the gate, a feed for empty cans and means actuated by each loaded can of said conveyor to release an empty can to be fed onto the scale.

12. In a can filling apparatus, a scale, a feed chute, and a feed gate for the chute comprising a frame having a plurality of spaced pins forming the gate proper and having free pointed ends.

13. In a can filling apparatus, a scale, a feed hopper, a rectangular frame having guides in which it is reciprocable beneath the hopper, a series of spaced pointed pins mounted at one end in the frame and forming the gate proper, latch means to hold the gate open, spring means tending to close the gate, and scale controlled means to unlatch the gate.

14. In a can filling apparatus, a scale, a feed hopper, a rectangular gate frame having guides in which it is reciprocable beneath the hopper, a series of parallel pointed pins in the frame forming the gate proper, latch means to hold the gate open, spring means tending to close the gate, scale controlled means to unlatch the gate, a cam means to reset the gate, and means to operate the cam by the movement of loaded cans away from the scale.

15. In an apparatus for filling cans, a feed chute, means to feed articles one at the time through said chute, a movable gate for the chute adapted to penetrate and hold any article in its path, and means to discharge the article from the gate as it is opened, substantially as described.

In testimony whereof I affix my signature.

ALBERT BABENDREER.

Witness:
CHAS. L. RUSHING.